E. S. FIELDS.
Machine for Scraping Tubes before and after Soldering.
No. 218,249. Patented Aug. 5, 1879.
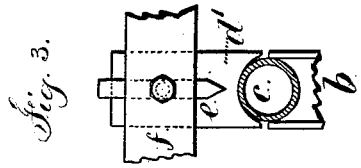
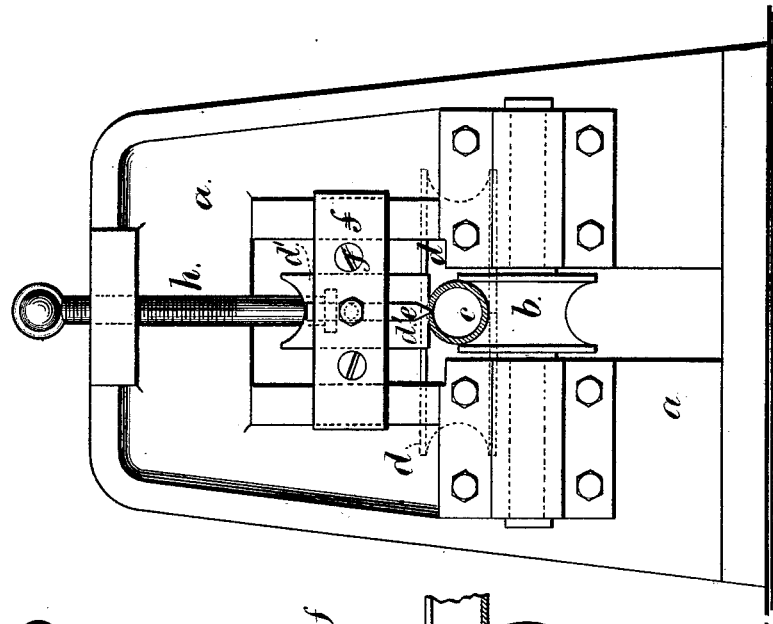
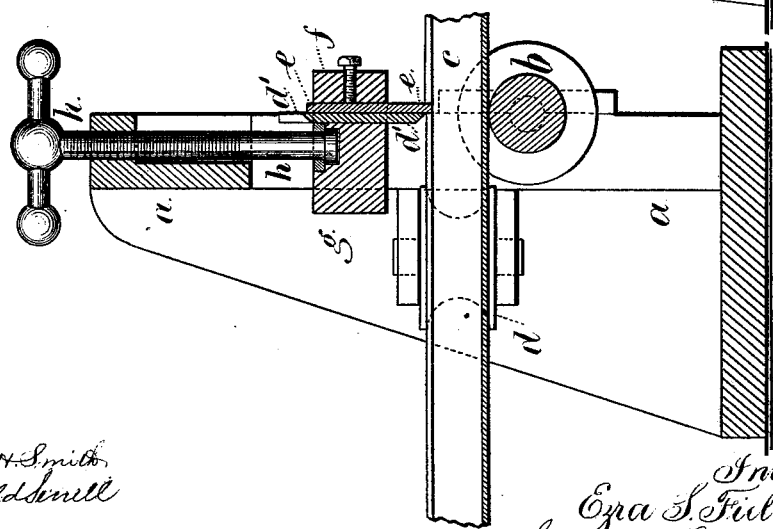

UNITED STATES PATENT OFFICE.

EZRA S. FIELDS, OF WATERBURY, CONNECTICUT, ASSIGNOR TO HOLMES, BOOTH & HAYDENS, OF SAME PLACE.

IMPROVEMENT IN MACHINES FOR SCRAPING TUBES BEFORE AND AFTER SOLDERING.

Specification forming part of Letters Patent No. 218,249, dated August 5, 1879; application filed May 2, 1878.

*To all whom it may concern:*

Be it known that I, EZRA S. FIELDS, of Waterbury, in the county of New Haven and State of Connecticut, have invented an Improvement in Scraping Tubing and Soldered Joints, of which the following is a specification.

In manufacturing sheet-metal tubing it is usual to bend up a strip of metal by a die or rollers into a tubular form, with the edges of the metal contiguous, and then, after annealing, both the edges and the surface adjacent to the edges are scraped previous to soldering the joint. This is generally done by hand, a pointed tool being used between the edges and a flat tool upon the surface. By this process five distinct operations are required to prepare the tube for soldering. This operation is well known, and needs no further description. In some instances the surplus solder has been scraped off by a stationary cutter attached to a die that guides and supports the pipe while the same is drawn beneath the scraper. In this operation it is necessary to apply lubricating material to the surface of the tube; otherwise the friction and particles accumulating upon the surface of the die injure the pipe.

Lubricating material is detrimental when used in the scraping operation before the pipe is soldered, as it gets upon the edges of the tube and prevents a perfect union of the joints.

My invention consists in a V-shaped pointed stationary scraping-tool, acting between the edges of the sheet metal to clean the same, and a surface-scraper, to act upon the metal near the edges, in combination with a support that keeps the tube in its proper position relatively to the scraper while being drawn through and scraped preparatory to soldering. I prefer and use a roller or rollers with a semicircular groove to support such tube while being scraped, and I combine with such grooved roller or rollers an adjustable scraping-cutter with a concave edge, to remove the surplus solder from the joint. By the use of this grooved roller or rollers the pipe can be scraped and the surplus solder removed without the other portions of the tube being scratched or injured, and lubricating material is rendered unnecessary.

In the drawings, Figure 1 is an elevation of the scraping mechanism transversely to the pipe. Fig. 2 is a vertical section longitudinally of the pipe, and Fig. 3 is an elevation of the device for scraping off the surplus solder of the joint.

The frame $a$ carries the grooved roller $b$, that receives the pipe $c$; and there may be rollers at $d$ upon vertical shafts, that serve to guide and retain the pipe in shape as it is operated upon.

The pointed scraping-tool $e$ is in front of the surface-scraping tool $d'$. They are properly positioned relatively to each other, and secured by the clamping-bar $f$ and its screws to the adjustable head $g$, that is movable vertically in the frame $a$, and is adjusted to suit the diameter of the pipe by means of the screw $h$.

As a length of pipe is drawn or forced through this apparatus the tool $e$ will scrape the adjacent edges of the metal tube, and the tool $d'$ will scrape the surface of the tube adjacent to those edges, so that the tube will be clean at these places, and adapted to receive the solder or brazing that unites the edges forming the complete tube. After the tube is scraped the tools $d'$ and $e$ are removed and the rolls $d$ adjusted nearer together, so that when the tube is run through the apparatus a second time the joints will be closed tightly at the inner portions of the adjacent edges. The brazing or soldering is then to be done in the usual manner.

The surface of the tube is scraped to remove the surplus solder and render it smooth and true by using the apparatus before described, except that the pointed tool $e$ is removed. The tool $d'$ is provided with a scraping-edge that is concave, corresponding, or nearly so, with the periphery of the tube, so that the surplus solder is removed and the joint rendered uniform with the tube.

I am aware that tubes have been scraped by a tool introduced between the edges of the rolled-up strip to scrape the surfaces, and that the tube has been pressed together and held with the edges in contact while being soldered.

In this instance the mechanism employed is necessarily complicated, and the solder may not run in between the surfaces, and the joint will be imperfect and liable to open when the surplus solder is cleaned off. By the use of my improvement the seam is not sprung open, and the tool that scrapes the adjacent edges, being pointed, leaves a channel that is sufficiently wide at the top to receive the solder, and the joint is further strengthened by the metal of the surface being scraped flat, so as to allow sufficient width for the solder upon the surface when the surplus is scraped by a concave tool.

I claim as my invention—

1. In a machine for scraping the adjacent edges of sheet-metal tubing, the combination of a V-shaped tool, $e$, acting between the edges, and a scraper, $d'$, acting upon the surface adjacent to the edges, and a grooved roller, $b$, that supports the sheet-metal tubing, substantially as set forth.

2. The combination of the scraping-tool $d'$ with the grooved supporting-roller $b$, substantially as and for the purposes set forth.

Signed by me this 26th day of November, 1875.

EZRA S. FIELDS.

Witnesses:
A. S. CHASE,
A. M. BLAKELY.